United States Patent
DeMartin et al.

(10) Patent No.: US 6,226,672 B1
(45) Date of Patent: *May 1, 2001

(54) METHOD AND SYSTEM FOR ALLOWING USERS TO ACCESS AND/OR SHARE MEDIA LIBRARIES, INCLUDING MULTIMEDIA COLLECTIONS OF AUDIO AND VIDEO INFORMATION VIA A WIDE AREA NETWORK

(75) Inventors: Frank DeMartin, Bogota; Peter Douma, Wyckoff, both of NJ (US); Denise Miccoli, Yonkers, NY (US)

(73) Assignees: Sony Corporation, Tokyo (JP); Sony Electronics, Inc., Park Ridge, NJ (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/850,520

(22) Filed: May 2, 1997

(51) Int. Cl.[7] .................................... G06F 15/16
(52) U.S. Cl. .................. 709/219; 709/202; 709/203; 709/206; 709/217; 709/246; 709/238; 369/30; 369/24; 369/83; 369/84; 369/85
(58) Field of Search .................. 369/2, 14, 49, 369/30; 707/5; 709/206, 219, 217, 203, 238, 231; 348/7, 6; 455/45, 4.2; 345/328, 302

(56) References Cited

U.S. PATENT DOCUMENTS

| | | | |
|---|---|---|---|
| 4,703,465 | * 10/1987 | Parker | 369/30 |
| 5,307,456 | * 4/1994 | MacKay | 345/328 |
| 5,499,046 | * 3/1996 | Schiller et al. | 348/6 |
| 5,579,537 | * 11/1996 | Takahisa | 455/66 |
| 5,583,561 | * 12/1996 | Baker et al. | 348/7 |
| 5,583,763 | * 12/1996 | Atcheson et al. | 364/551.01 |
| 5,592,551 | * 1/1997 | Lett et al. | 380/20 |
| 5,596,705 | * 1/1997 | Reimer et al. | 395/326 |
| 5,616,876 | * 4/1997 | Cluts | 84/609 |
| 5,633,839 | * 5/1997 | Alexander et al. | 369/30 |
| 5,721,951 | * 2/1998 | DorEl | 395/830 |
| 5,722,669 | * 3/1998 | Obata et al. | 345/2 |
| 5,751,672 | * 5/1998 | Yankowski | 369/30 |

(List continued on next page.)

FOREIGN PATENT DOCUMENTS

| | | |
|---|---|---|
| 719046 | * 11/1995 | (DE) . |
| 847156 | * 9/1997 | (DE) . |
| 831608 | * 11/1997 | (GB) . |

OTHER PUBLICATIONS

MCS/Others to Offer Internet Music Service, Nov. 1996.*
The Split and Merge (SAM) Protocol for Interactive Video–on–Demand Systems, Jan. 1997.*
Scheduling Video Programs in Near Video–On–Demand Systems, Jan. 1997.*
Tunes.com.*
Musicmaker.com.*

Primary Examiner—Mehmet B. Geckil
Assistant Examiner—William C. Vaughn, Jr.
(74) Attorney, Agent, or Firm—Frommer Lawrence & Haug, LLP.; William S. Frommer; Glenn F. Savit

(57) ABSTRACT

Using a music oriented Web site, a "student" user requests a tutorial or tour of a musical artist or genre on the World Wide Web portion of the Internet. The "expert" user peruses the "student" personal music library and creates a playlist for that library to assist in further understanding of the music by the "student" user. The playlist is transferred to a server which generates a command file. This command file is sent to the "student" user to control various multimedia components according to the "expert" user's selection. This tutorial may be accompanied by the "expert" user's personal commentary on his/her selections.

14 Claims, 5 Drawing Sheets

U.S. PATENT DOCUMENTS

| | | | | |
|---|---|---|---|---|
| 5,787,423 | * | 7/1998 | Hirakawa | 707/5 |
| 5,796,945 | * | 8/1998 | Tarabella | 395/326 |
| 5,818,435 | * | 10/1998 | Kozuka et al. | 345/302 |
| 5,819,160 | * | 10/1998 | Foladare et al. | 455/45 |
| 5,826,102 | * | 10/1998 | Escobar et al. | 345/302 |
| 5,838,314 | * | 11/1998 | Neel et al. | 345/327 |
| 5,864,868 | * | 1/1999 | Contois | 707/104 |
| 5,886,698 | * | 3/1999 | Sciammarella et al. | 345/349 |
| 5,892,915 | * | 4/1999 | Duso et al. | 709/219 |
| 5,900,608 | * | 5/1999 | Iida | 235/381 |
| 5,918,213 | * | 6/1999 | Bernard et al. | 705/26 |
| 5,931,901 | * | 8/1999 | Wolfe et al. | 709/206 |
| 5,953,005 | * | 9/1999 | Liu | 345/302 |
| 5,956,716 | * | 9/1999 | Kenner et al. | 707/10 |
| 5,963,916 | * | 10/1999 | Kaplan | 705/26 |
| 5,973,722 | * | 10/1999 | Wakai et al. | 348/8 |
| 5,983,069 | * | 11/1999 | Cho et al. | 455/3.1 |
| 5,995,951 | * | 11/1999 | Ferguson | 706/10 |
| 6,118,450 | * | 9/2000 | Proehl et al. | 345/349 |

* cited by examiner

METHOD AND SYSTEM FOR ALLOWING USERS TO ACCESS AND/OR SHARE MEDIA LIBRARIES, INCLUDING MULTIMEDIA COLLECTIONS OF AUDIO AND VIDEO INFORMATION VIA A WIDE AREA NETWORK

BACKGROUND OF THE INVENTION

The present invention is related to network communications and, in particular, to a method and system for allowing users to access and/or share personal media libraries, including multimedia collections of audio and video information, via a wide area network or a group of networks, i.e., the Internet, for example.

One cannot disagree that appreciation of music is enhanced through greater understanding of the performing artists, as well as of the music itself. In most cases, music experts offer invaluable information on a particular music piece, genre or artist, which is not widely known by the public. Based on the music collection owned by an average user, the experts may reveal to the user a different listening experience by arranging the pieces to play in a particular order and by providing a personal commentary accompanying this arrangement.

The average user, however, typically has no access to this tailor-made expert information. Namely, the user may own a number of Compact Disks (CD) with classical music, for example, and he or she listens to these CDs in random order. Although the pieces in the user personal library can be researched individually to determine what every one of them represents, the user typically cannot properly digest and synthesize such a piece-meal information to obtain a collection that transcends the user's random listening. Only with the music experts' help can the user achieve that ultimate listening experience by combining individual pieces from various CDs to form a special playlist: it is as if a unique CD or tape were produced for the user by an expert or group of experts. It is possible to obtain such a unique CD by spending a lot of effort in laboriously writing down the titles of each album and sending them to the experts. Or, the experts may be invited to the user's home for advice and coffee. Both alternatives do not appear to be viable or, at best, easily achievable.

OBJECTS OF THE INVENTION

It is an object of the present invention to provide access to the contents of multimedia information over the wide area network.

It is another object of the present invention to share the contents of multimedia information over the wide area network.

It is a further object of the present invention to transfer multimedia information over the wide area network.

It is still another object of the present invention to control by a first user a multimedia component in an audio/video/data system of a second user remotely located from the first user.

It is yet a further object of the present invention to reproduce information on a multimedia component in the audio/video/data system of the first user according to a playlist compiled by the second user.

SUMMARY OF THE INVENTION

These and other objects, features and advantages are accomplished by a method and system for accessing, over a wide area network, multimedia equipment for reproducing multimedia information recorded on data storage media. According to the present invention, a list of contents of the multimedia information is generated and modified to include only user selected multimedia information. The modified list of contents is converted to at least one command for controlling the multimedia equipment. The multimedia equipment is then controlled based on this command, wherein the user selected multimedia information is reproduced on the multimedia equipment based on the modified list of contents.

In accordance with one aspect of the present invention, the list of contents is generated by a first user and is transferred via the wide area network to a second user. The second user modifies the list of contents, wherein the modified list of contents is transferred via the wide area network to the first user for reproducing the multimedia information only as selected by the second user.

In accordance with another aspect of the present invention, the list of contents is generated and modified by the first user. The modified list of contents is then transferred via the wide area network to the second user for reproducing the multimedia information only as selected by the first user.

BRIEF DESCRIPTION OF THE DRAWINGS

The above-mentioned as well as additional objects, features and advantages of the invention will become readily apparent from the following detailed description thereof which is to be read in conjunction with the accompanying drawings, in which.

In all Figures, like reference numerals represent the same or identical components of the present invention.

DETAILED DESCRIPTION OF THE PREFERRED EMBODIMENTS

As a general overview, the present invention allows the user of any video/audio/data equipment to receive an expert's advice on how to arrange the user personal multimedia library for reproduction of information in multimedia equipment in accordance with the expert's advice. This advice—in a form of an on-line tutorial accompanying the suggested order of the audio/video/data reproduction—is obtained without leaving the confines of the user's living room with the minimum of effort involved.

Figure 1:
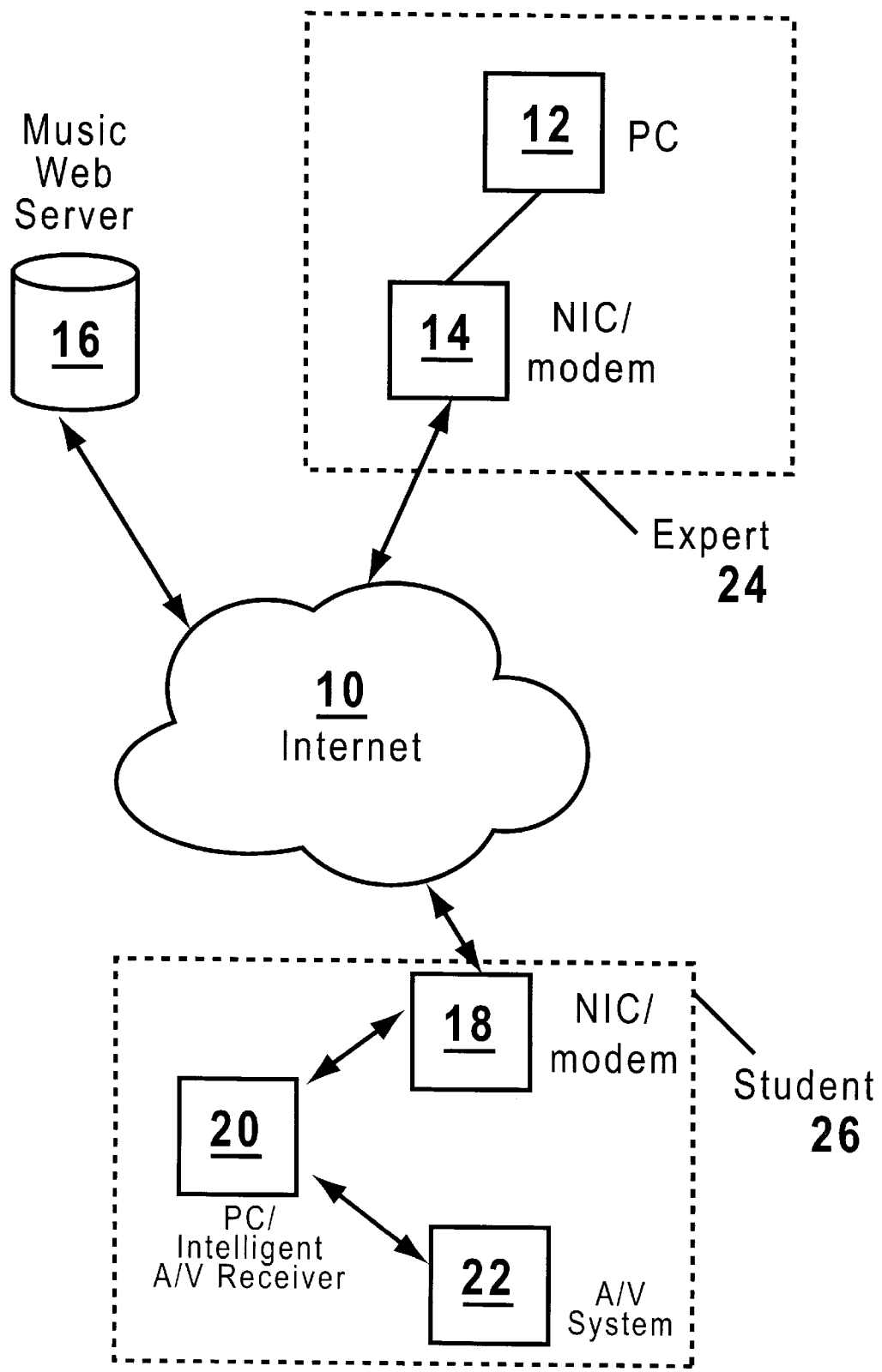
FIG. 1 is a block diagram of the system for providing a remote access of multimedia information over the Internet.

The invention will now be described in detail with reference to the accompanying drawings. FIG. 1 is a block diagram of the system for providing a remote access of multimedia information over the Internet. Shown in FIG. 1 is the Internet 10, which is a group of interconnected networks with various servers attached to those networks for providing information to users (clients) on the Internet, as well known to people skilled in the art of the network communications. Via the Internet, users around the world communicate with each other, access various information in databases, receive from those databases (download) information for personal use, etc. The World Wide Web (WWW) is probably the most interesting and widely used section of the Internet containing graphics images in addition to text.

As shown in FIG. 1, connected to the Internet 10 is representative client workstation 26 (hereinbelow referred to as Student). The reason for referring to this workstation as Student will become clear in connection with the explanation of the system operation hereinbelow. Student 26 includes audio/video (A/V) system 22 that may contain one or several interconnected multimedia reproduction devices, such as a CD player, a Video Tape Recorder (VTR), a Digital Video Disk (DVD) player, a Digital Audio Tape (DAT) player, etc.

Further included in Student 26 is a general purpose computer, such as a ubiquitous personal computer (PC), or intelligent audio/video (A/V) receiver 20. Either one of these devices is communicatively coupled to audio/video (A/V) system 22 for controlling the operation thereof.

PC/Intelligent A/V receiver 20 is attached to the Internet via Network Interface Card (NIC)/modem 18. That is, PC/Intelligent A/V receiver 20 establishes a node—via NIC/modem 18—on a particular network, which is a part of the Internet. The NIC serves as the interface for PC/Intelligent A/V receiver 20 by setting up a communications path with users of various networks (via the Internet) in conformance with the Internet protocol. Alternatively, the dial-up modem may be used for logging on to the network by following the proper communications protocol, as well known in the art.

At a geographical location that may be remotely located from Student 26, be it several miles or several thousand miles apart, another client workstation is located. This client workstation is referred to as Expert 24, as shown in FIG. 1. Again, the reason for this terminology will become obvious following the description of the system operation hereinbelow. Expert 24 has a general purpose computer (PC 12) and NIC/modem 14, that are similar to the PC and NIC/modem of the Student configuration. Similar to the above-described setup in Student 26, the Internet connection is achieved via PC 12 and NIC/modem 14.

Further shown in FIG. 1 is Music Web server 16. The server is typically a fast-processing computer (a mid-range, a mainframe, multiprocessors, etc.) having a fast access to a local or remote database. Music Web server 16 maintains a music site on the WWW accessible by such client stations as Student 26 and Expert 24, among others. As known in the art, a Web site may have a title page as well as several additional pages which are optional, along with Hypertext Transfer Protocol (HTTP) links to various other Web sites, for example. The music Web site maintained by Music Web server 16 provides the database collection of titles for CDs, video tapes, DVDs, etc. That is, the database stores titles of songs, movies, games, etc. recorded on various data storage media (analog or digital) and reproduced in audio/video/data system, such as A/V system 22, for example.

Figure 2:
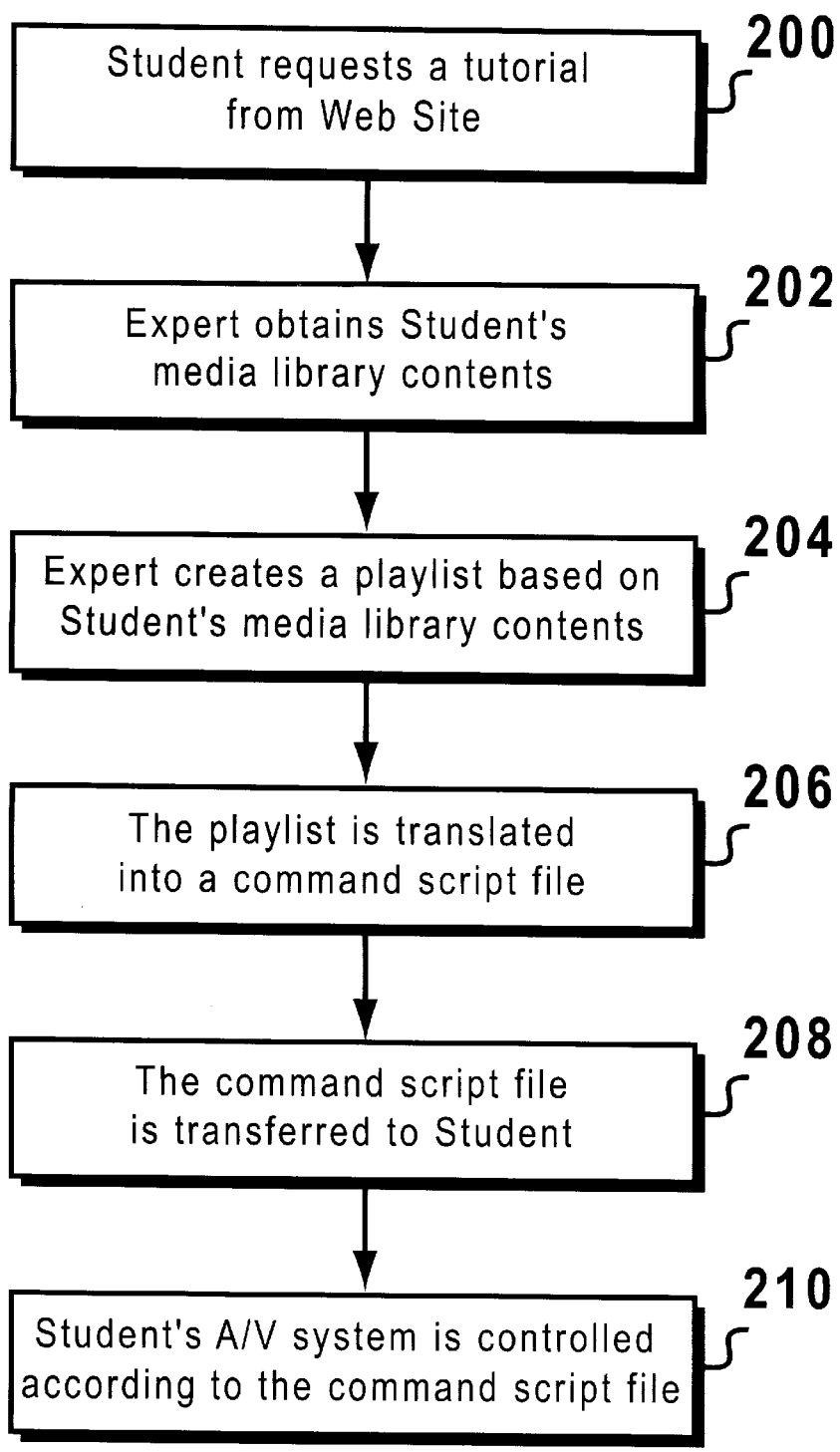
FIG. 2 is a functional flowchart for providing remote access of multimedia information over the Internet.

The system operation will now be described with reference to the sequencing flowchart of FIG. 2. Each step, as summarized in FIG. 2, will be explained in detail, whose understanding might be facilitated by referring to the block diagram of FIG. 1.

In step 200, Student 26 requests a tutorial from the Music Web site. In particular, let it be assumed that the user has in his CD changer (such as a 200 CD changer produced by Assignee of the present invention) of A/V system 22 multiple CDs with various recordings thereon. From his multiple CDs in the CD changer, the user would love to listen to a collection of jazz songs, as compiled by the on-line music expert. Using the personal computer and modem, he logs onto the Internet to obtain such a compilation. The Internet log-on connection may occur through proprietary content-providers, such as America OnLine® or CompuServe®, or through service providers without any proprietary content but serving as a gateway to the Internet, such as Erol's®, for example.

After being linked to the Internet, the user "surfs" to the Music Web site, either by entering the appropriate domain name (starting with HTTP) or by using any of the commercially available "Web" browsers. As known in the art, a "Web" browser provides Graphical User Interface (GUI) access to network servers. At the home page (or any other page) of the Music Web site, the user requests a "music tutorial" by pointing and clicking on that option. A mouse, for example, or any other conventional input device may be used for navigating through the Internet and the Web site. The "music tutorial" option, provided by the Music Web site, is displayed on the computer screen and is selected by the user. Hence, the user is referred to as "Student," as shown in FIG. 1 and referred to throughout the description.

Next, Expert 24 obtains Student's media library contents in step 202. In this step, Music Web server 16 sends a command to the CD changer of A/V system 22 via the PC of PC/Intelligent A/V system 20. For control and file transfer between these devices, any of the file transfer protocols (known in the art as FTP) may be used, as long as the FTP is supported by the Internet standard. The command issued by Music Web server 16 requires the PC to read Table of Contents (TOC) of each disk in the CD changer. Namely, the PC reads the TOC of each disk and sends this data—using the FTP—back to Music Web server 16.

As known in the art, the TOC on each disk is a special recording area allocated for various "house-keeping" non-informational data about the disk, including, among other things, the number of tracks and the length of each track. The TOC may be easily analogized to a File Allocation Table (FAT), for example, recorded on computer floppy disks. As also known in the art, information on a CD may be identified by the TOC data. That is, the number of tracks and the length of each track recorded in the TOC area uniquely identify the title of the CD and the name of each track thereon: the TOC data for the Tupac Shakur CD is different than the TOC data for the Rachmaninoff CD.

As a result of this "fingerprint" data, the TOCs read from each disk in the CD changer can be matched against the corresponding title and name of the track stored in the database of Music Web server 16. It is understood, of course, that such information, namely, CD titles and names of the tracks corresponding to the TOC data, has been pre-loaded in a form of a look-up table, for example, into the database. In response to the read command, the PC obtains the TOCs from the CDs in the CD changer and transfers this data to Music Web server 16. Using the database, the TOC data from each CD is matched against its title and the name of each track on that CD. The Student's library file, comprising a list of the CD titles and track names that are currently in the CD changer, is thus generated by Music Web server 16.

The generated Student's library file is then transferred to another user (or users), referred to as Expert 24, because a music connoisseur is staffing this computer station. There are many alternatives as to how the music connoisseur finds out that the list is waiting to be transferred. The most obvious method is for the music connoisseur to periodically log on to the Internet and access the Music Web site. Once he or she has access to the Music Web site, the music connoisseur selects the "file transfer" option on the home page. The Student's library file is then downloaded to Expert 24.

Another alternative is to notify the music connoisseur of the Student's library file by an audible tone or the like, similar to the e-mail notification as currently employed by many computer programs. Naturally, several other alternatives will become obvious to those skilled in the art following this disclosure of the present invention.

Regardless of how Expert 24 determines that Music Web server 16 generated the Student's library file with the request for the tutorial session, this library file is transferred, via the FTP, to PC 12 using NIC/modem 14 as the communications interface device.

Following the file transfer operation, in step 204, Expert 24 creates a playlist based on the Student's media library contents. Expert 24 views the library contents on the computer monitor, for example, and selects the CD titles or track names via the input device. Alternatively, the Student's media library contents can be printed out on a printer, if available, as desired by Expert 24. After reviewing the Student's library contents, Expert 24 arranges selected songs, video, or other information for reproduction in a particular order to expertly introduce Student 26 to classical music, for example. Using the above example, the music connoisseur selects jazz from the Student's library and arranges the CDs and/or individual songs on the CDs for reproduction in A/V system 22 in the particular order.

The selected songs or CD titles are saved in a file (as ASCII code, for example), containing a playlist in the requested genre intended for Student 26. The thus created playlist is then transferred from PC 12 to Music Web server 16 via NIC/modem 14.

In step 206, the playlist is translated into a command script file. That is, after receiving the playlist file, Music Web server 16 uses the Common Gateway Interface (CGI) program or other server program to form a command script file from the playlist. The command script file includes a series of commands for controlling A/V system 22 in compliance with a smart control protocol used in multimedia components. For example, the Assignee of the present invention has such a protocol referred to as S-Link™. This protocol provides the complete integration of multimedia components into a single coherent system: the components in this system are automatically configured (e.g., switch to a proper mode of operation) in according with the user action. For example, when the user inserts a tape into a VTR, the audio/video receiver changes to the VTR playback mode without any additional user involvement.

Next, in step 208, the command script file is transferred to Student 26. In particular, using the appropriate FTP, the command script file is sent to PC/Intelligent A/V receiver 20 via NIC/modem 18. PC/Intelligent A/V receiver 20 parses the command script file to obtain a series of commands for controlling A/V system 22.

Finally, in step 210, Student's A/V system 22 is controlled according to these commands. Namely, PC/Intelligent A/V receiver 20 executes the commands to play the CDs in the CD changer, for example, as selected by the music connoisseur. Using the control protocol and without any user involvement, appropriate components of Student A/V system 22 will be activated, and information will be reproduced from various types of data storage media, such as CDs, DVDs, tapes, etc. in response to the playlist compiled by Expert 24.

Figure 3:
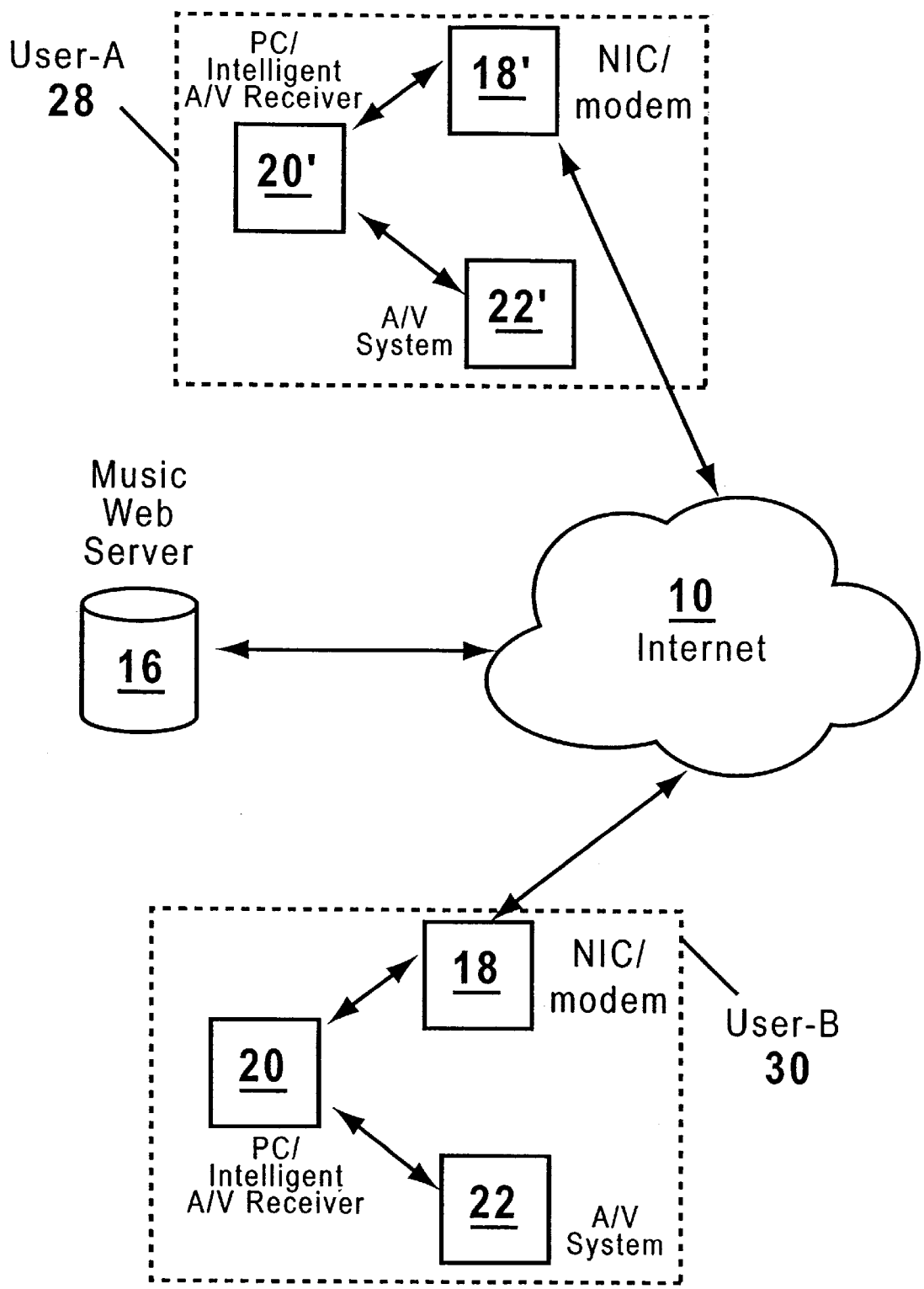
FIG. 3 is a block diagram of the system for sharing multimedia information between two Internet users in accordance with another aspect of the present invention.

In another aspect of the present invention, peers may exchange playlists among themselves, as opposed to the music connoisseur sending a playlist to the student as described above. FIG. 3 shows a block diagram of the system for sharing multimedia information between two Internet users, for example. Since identical or similar elements in FIGS. 1 and 3 are designated with the same reference characters, description of those elements in FIG. 3 which were previously described with reference to FIG. 1 will be omitted to avoid redundancy.

FIG. 3 is similar to FIG. 1, except that in FIG. 3 both Internet users have an A/V system and a PC/Intelligent A/V receiver. In particular, User-B 30 of FIG. 3 has PC/Intelligent A/V receiver 20 connected to the Internet 10 via NIC/modem 18. PC/Intelligent A/V receiver 20 controls A/V system 22, as described above. Similar to this setup, User-A 28 has A/V system 22', PC/Intelligent A/V receiver 20' and NIC/modem 18' for connection to the Internet 10. As previously explained, Music Web server 16 has the database of music titles, track names, etc. for matching with the TOC data.

Figure 4:
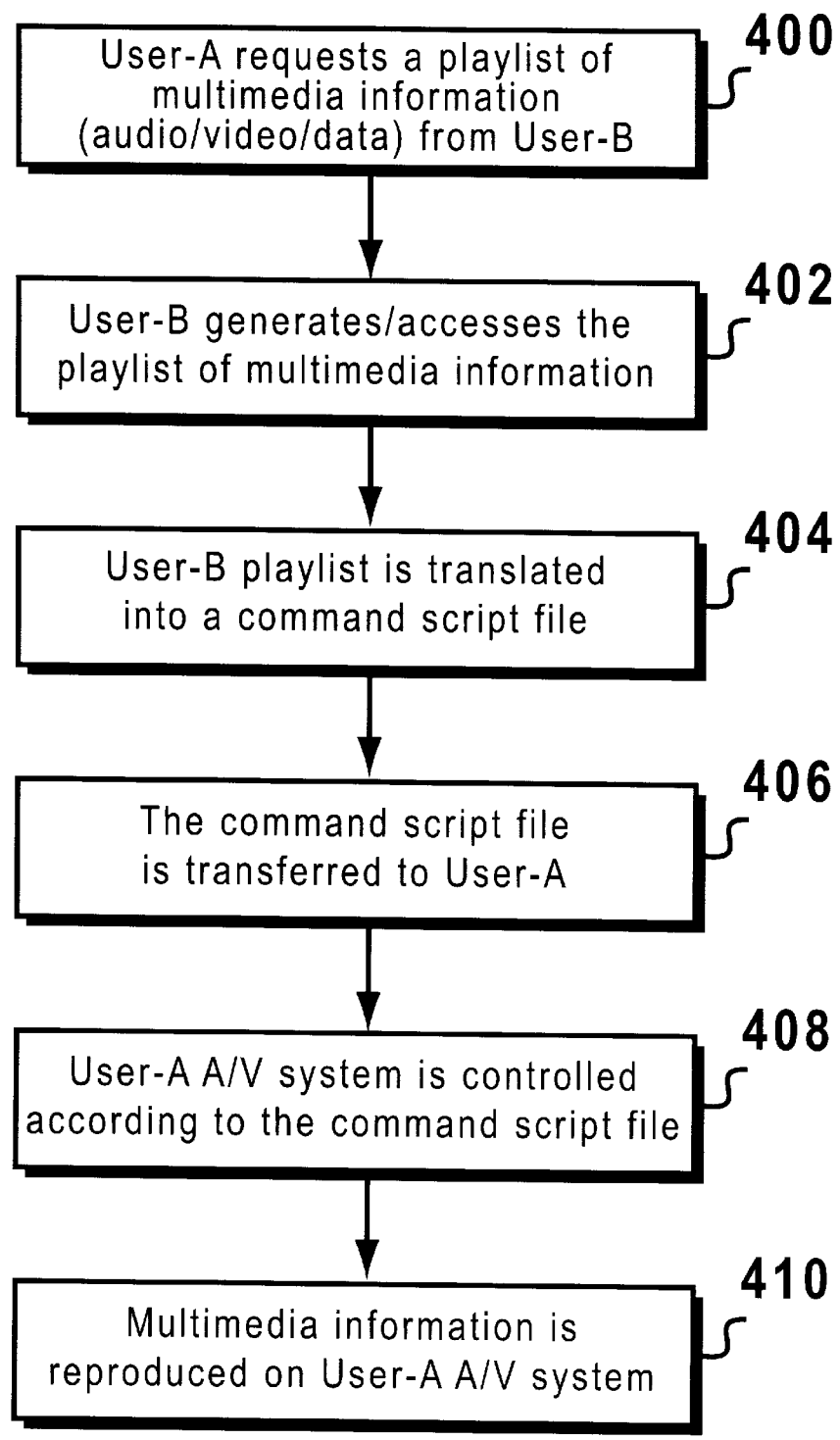
FIG. 4 is a functional flowchart for sharing the multimedia information between two Internet users.

In operation, as shown in FIG. 4, User-A 28 requests a playlist from User-B 30 in step 400. If User-B 30 desires to share the playlist in step 402, then he or she sends the playlist to Music Web server 16 via PC/Intelligent A/V receiver 20 and NIC/modem 18. Music Web server 16, using the appropriate server program, translates the playlist into a command script file in step 404. In step 406, the command script file is transferred to User-A 28 via the Internet and NIC/modem 18'. User-A's A/V system 22' is controlled, in step 408, in accordance with the command script file. That is, information is reproduced in step 410, based on the User-B's playlist, from the various recording media, such as CDs, DVD, tapes, etc., under the control of PC/Intelligent A/V receiver 20'.

Figure 5:
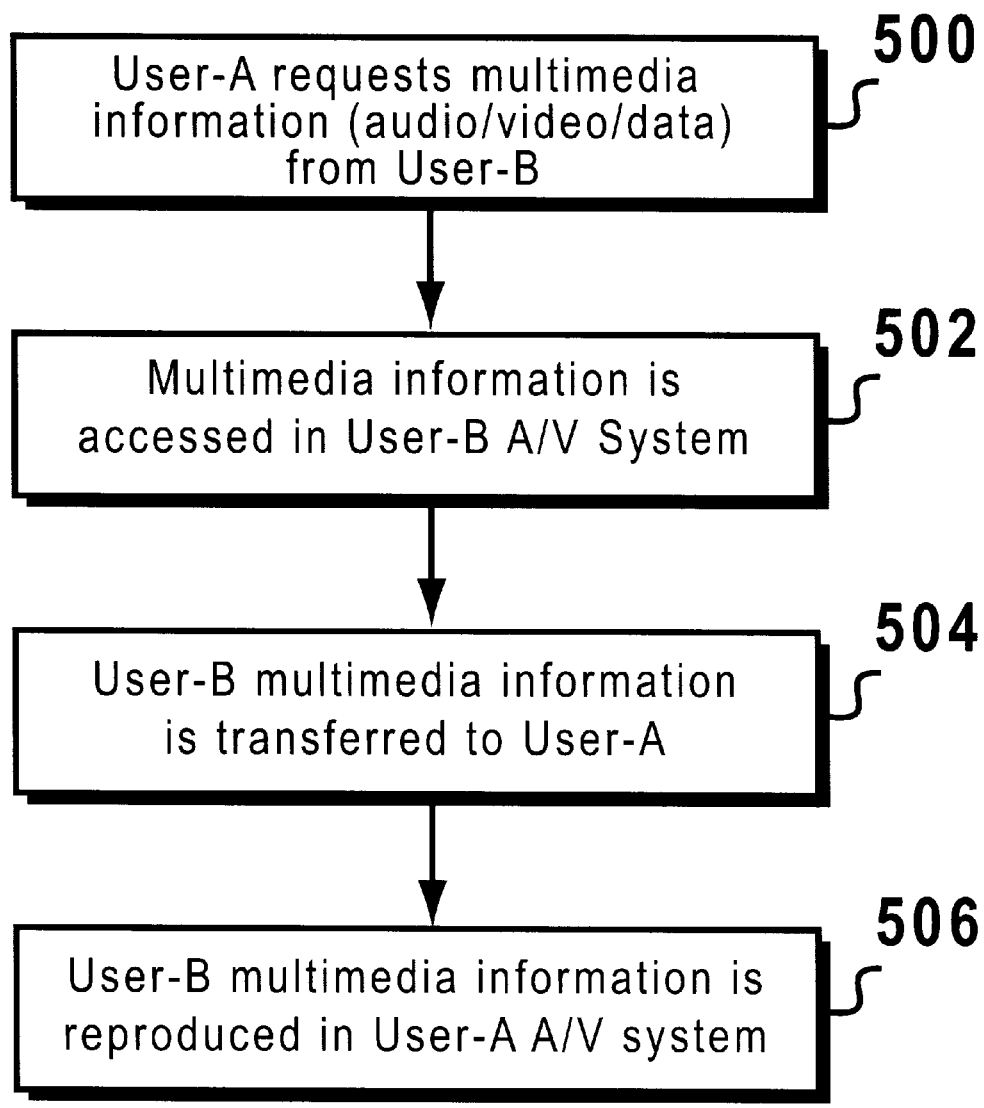
FIG. 5 is a functional flowchart for transferring data between two users in accordance with yet another aspect of the present invention.

In yet another aspect of the present invention, actual recording information, not only the playlists, may be exchanged between two Internet users. As illustrated in the sequencing flowchart of FIG. 5 with reference to the system block diagram of FIG. 3, User-A 28 accesses the Music Web site run by Music Web server 16 and requests multimedia information, such as audio/video/data, from User-B 30 in step 500. If User-B 30 affirmatively responds to this request, PC/Intelligent A/V receiver 20 reads, in step 502, the requested multimedia information from the appropriate recording media in A/V system 22. This information is transferred, via the Internet and under the control of Music Web server 16, to PC/Intelligent A/V receiver 20' of User-A 28 in step 504. Subsequently, User-B's information, as controlled by PC/Intelligent A/V receiver 20', is transferred to A/V system 22' (i.e., any data storage media including disks, tapes, RAM memory, etc.) for reproduction, in step 506, on the appropriate system component.

Throughout the above description, reference was made to PC/Intelligent A/V receiver 20. Either the PC or A/V Intelligent receiver may used in the present invention. That is, the PC may perform the function of logging on and connecting to the Internet, of accessing the Music Web site, and of controlling the audio/video/data equipment, as described above. Alternatively, the intelligent A/V receiver, controlled by a programmable controller, for example, can replace the PC by providing an access to the Music Web site only and by allowing the user to perform the selection operations as described above. In effect, the intelligent A/V receiver may operate as a dedicated Music Web site access device, in addition to its other functions, to replace the need for the PC.

In addition, personal commentary of the music connoisseur or peer may accompany the playlist to the student/peer.

Namely, when the playlist from Expert 24 or User B 30 is transferred to Music Web server 16, a text file containing the description of the selected information, an opinion on its content, etc. may be attached to the playlist file. This commentary file is created by entering the text into the PC, etc. using any conventional input device, such as the keyboard. The personal commentary then appears on the display screen of the monitor in Student 26 or in User A 28 to accompany the reproduction of the CD information, for example. This personal commentary—ranging from an objective historical information to subjective opinions— further facilitates the understanding of the audio/visual material received by the student/peer.

It is understood that while the Internet is used in the above description as the communications network, the example of using the Internet is illustrative only. Any wide area network, as known in the art, having at least two nodes and establishing a communications path between those nodes, that is between the music server and clients, can be used without detracting from the scope and spirit of the present invention.

Having described specific preferred embodiments of the invention with reference to the accompanying drawings, it is to be understood that the invention is not limited to those precise embodiments, and that various changes and modifications may be effected therein by one skilled in the art without departing from the scope or the spirit of the invention as defined in the appended claims.

What is claimed is:

1. A system for accessing, over a wide area network, multimedia equipment for reproducing multimedia information recorded on data storage media, comprising:

a server for generating a list of contents of multimedia information recorded on data storage media of a first user at a first equipment location, the server being operative to receive, over the wide area network from equipment of said first user, table of contents (TOC) data read from the first user's data storage media and to generate said list of contents by matching said received TOC data against data stored in a database to thereby identity corresponding multimedia information, the server being further operative to transmit said list of contents via said wide area network to a second user at a second equipment location, said second user modifying the generating list of contents by selecting items from said list of contents and rearranging the selected items to produce a rearranged list of contents;

converting means for converting the rearranged list of contents to at least one command for controlling the multimedia equipment; and controlling means for controlling the multimedia equipment based on said one command, wherein the multimedia information recorded on the first user's storage media is reproduced on the multimedia equipment based on the rearranged list of contents.

2. The system according to claim 1, wherein said server provides a user interface for requesting the list of contents to be modified.

3. The system according to claim 1, wherein the list of contents is generated on the basis of data uniquely identifying the contents of each data storage medium in the data storage media.

4. A method for accessing, over a wide area network, multimedia equipment for reproducing multimedia information recorded on data storage media, said method comprising the steps of:

receiving, by a server over the wide area network, table of contents (TOC) data read from data storage media of a first user at a first equipment location, said server generating a list of contents of multimedia information recorded on said data storage media of the first user by matching said received TOC data against data stored in a database to thereby identify corresponding multimedia information;

transferring, said server, said list of contents via said wide area network to a second user at a second equipment location who modified the generating list of contents by selecting items from said list of contents and rearranging the selected items to produce a rearranged list of contents, converting the rearranged list of contents to at least one command tor controlling the multimedia equipment; and controlling the multimedia equipment based on said one command, wherein the multimedia information recorded on the first user's storage media is reproduced on the multimedia equipment based on the rearranged list of contents.

5. A method according to claim 4, further comprising the step of providing, by said server, user interface for requesting the list of contents to be modified.

6. The method according to claim 4, wherein the list of contents is generated on the basis of data uniquely identifying the contents of each data storage medium in said data storage media.

7. The system according to claim 1, wherein the corresponding multimedia information identified by said server comprises titles and track names.

8. The system according to claim 1, wherein the server is further operative to receive the rearranged list from the second user, form a command script file based on the rearranged list, and transmit the command script file to the multimedia equipment of the first user which parses the command script file to obtain a series of control commands to control the multimedia equipment.

9. The method according to claim 4, wherein the step of converting the rearranged list to at least one command for controlling the multimedia equipment is performed at least in part by the server, the server receiving the rearranged list fi-on the second user, forming a command script based on the rearranged list, and transmitting the command script file to the multimedia equipment of the first user which parses the command script file to obtain a series of control commands to control the multimedia equipment.

10. The method according to claim 4, wherein the corresponding multimedia information identified by said server comprises titles and track names.

11. A server comprising:

receiving means for receiving table of contents (TOC) data over a wide area network, transmitted from equipment of a first user at a first equipment location, said TOC data having been read by said first user equipment from multimedia storage media retained therein;

generating means for generating a list of contents of multimedia information of said first user by matching said received TOC data against data stored in a database to thereby identify corresponding multimedia information;

transmitting means for transmitting said list of contents over the wide area network to a second user at a second equipment location, said second user rearranging the list of contents and transmitting the rearranged list back to the server; and, means for receiving the rearranged list and transmitting information corresponding to the rearranged list to the first user equipment to enable reproduction of multimedia information from the first user's storage media in accordance with the rearranged list.

12. The server according to claim 11, wherein said server forms a command script file based on the rearranged list and transmits said command script file to the first user as said information corresponding to the rearranged list, to enable control of the first user's multimedia equipment in accordance with the rearranged list.

13. The server according to claim 11, wherein the multimedia information is music, and said list of contents is a list of songs.

14. The server according to claim 11, further comprising means for transmitting a request to said first user equipment to read said TOC data from the storage media and to transmit the read TOC data to said server.

* * * * *